United States Patent
Hu et al.

(10) Patent No.: US 11,267,751 B2
(45) Date of Patent: Mar. 8, 2022

(54) HEAT TREATABLE COATED ARTICLE WITH SUBSTOICHIOMETRIC ZIRCONIUM OXIDE BASED LAYER AND CORRESPONDING METHOD

(71) Applicant: Guardian Glass, LLC, Auburn Hills, MI (US)

(72) Inventors: Xuequn Hu, Northville, MI (US); Gregory T. Gaudet, Ann Arbor, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 765 days.

(21) Appl. No.: 15/638,450

(22) Filed: Jun. 30, 2017

(65) Prior Publication Data

US 2019/0002339 A1 Jan. 3, 2019

(51) Int. Cl.
*C03C 17/245* (2006.01)
*C03C 17/27* (2006.01)

(52) U.S. Cl.
CPC ............ *C03C 17/245* (2013.01); *C03C 17/27* (2013.01); *C03C 2217/22* (2013.01); *C03C 2218/154* (2013.01); *C03C 2218/322* (2013.01)

(58) Field of Classification Search
CPC ............................ C03C 17/27; C03C 2217/22
See application file for complete search history.

(56) References Cited

U.S. PATENT DOCUMENTS

| 6,193,856 | B1 | 2/2001 | Kida et al. |
| 7,150,849 | B2 | 12/2006 | Veerasamy |
| 7,501,148 | B2 | 3/2009 | Veerasamy |
| 7,645,487 | B2 | 1/2010 | Petrmichl et al. |
| 2003/0143401 | A1* | 7/2003 | Hukari ............... C03C 17/3435 428/408 |
| 2005/0095430 | A1 | 5/2005 | Veerasamy |
| 2012/0202676 | A1* | 8/2012 | Bogaerts ............... C03C 3/078 501/32 |

(Continued)

FOREIGN PATENT DOCUMENTS

| CN | 102 786 231 | 11/2012 |
| DE | 2501660 A1 | 7/1976 |

(Continued)

OTHER PUBLICATIONS

Index of refraction for zirconium dioxide, no date.*

(Continued)

*Primary Examiner* — Alex A Rolland

(57) ABSTRACT

A layer of or including substoichiometric zirconium oxide is sputter deposited on a glass substrate via a substoichiometric zirconium oxide inclusive ceramic sputtering target of or including $ZrO_x$. The coated article, with the substoichiometric $ZrO_x$ inclusive layer on the glass substrate, is then heat treated (e.g., thermally tempered) in an atmosphere including oxygen, which causes the substoichiometric $ZrO_x$ inclusive layer to transform into a scratch resistant layer of or including stoichiometric or substantially stoichiometric zirconium oxide (e.g., $ZrO_2$), and causes the visible transmission of the coated article to significant increase.

31 Claims, 2 Drawing Sheets

(56) References Cited

U.S. PATENT DOCUMENTS

2012/0301693 A1* 11/2012 Dusoulier ............. C03C 17/245
                                                          428/215
2013/0015677 A1   1/2013 Gutierrez et al.
2014/0220359 A1   8/2014 Wang et al.
2014/0220360 A1   8/2014 Wang et al.

FOREIGN PATENT DOCUMENTS

EA         312597 B1    10/2009
EP        2 501 660      9/2012
RU        2570054 C2    12/2015
WO    WO 2011/062574     5/2011

OTHER PUBLICATIONS

Office Action received for RU Application No. 2020103745, dated Oct. 25, 2021, 21 Pages (09 Pages of English Translation and 12 Pages of Official notification).

* cited by examiner

HEAT TREATABLE COATED ARTICLE WITH SUBSTOICHIOMETRIC ZIRCONIUM OXIDE BASED LAYER AND CORRESPONDING METHOD

This invention relates to a coated article, and manufacturing method therefor, to be used in a window such as a shower window, a bathroom or shower door window, furniture glass, picture frame glass, other monolithic window, or any other suitable application. In certain example embodiments of this invention, a layer of or including substoichiometric zirconium oxide is sputter deposited, directly or indirectly, on a glass substrate via a substoichiometric zirconium oxide ceramic sputtering target of or including $ZrO_x$. The coated article, with the substoichiometric $ZrO_x$ layer on the glass substrate, is then heat treated (e.g., thermally tempered) in an atmosphere including oxygen, which causes the substoichiometric $ZrO_x$ layer to transform into a scratch resistant layer of or including stoichiometric or substantially stoichiometric zirconium oxide (e.g., $ZrO_2$), and causes the visible transmission of the coated article to significant increase.

BACKGROUND OF THE INVENTION

Windows are known in the art. Example windows are for residential and/or commercial use, and include for example and without limitation IG window units, monolithic windows, door windows, and/or interior shower windows. However, many windows are required to be tempered. Thermal tempering of the glass substrates typically requires heating the glass substrates to temperature(s) of at least about 580 or 600 degrees C. for a sufficient period of time to enable thermal tempering. Other types of coated articles also require heat treatment (HT) (e.g., tempering, heat bending, and/or heat strengthening) in certain applications. For example and without limitation, glass table tops and the like require HT in certain instances.

Diamond-like carbon (DLC) is sometimes known for its scratch resistant properties. For example, different types of DLC are discussed in the following U.S. Pat. Nos. 6,303,226, 6,303,225, and so forth, which are hereby incorporated herein by reference. It would sometimes be desirable to provide a window unit or other glass article with a protective coating including DLC in order to protect it from scratches and the like. Unfortunately, DLC tends to oxidize and burn off at temperatures of from approximately 350 degrees C. (possibly from 380 to 400 degrees C.) or higher, as the heat treatment is typically conducted in an atmosphere including oxygen. Thus, it will be appreciated that DLC alone as a protective overcoat cannot withstand heat treatments (HT) at the extremely high temperatures described above which are often required in the manufacture of vehicle windows, IG window units, glass table tops, tempered glass articles, and/or the like. Accordingly, DLC cannot be used alone as a coating to be heat treated, because it will oxidize during the heat treatment and substantially disappear as a result of the same (i.e., it will burn off). Certain other types of scratch resistant materials also are not capable of withstanding heat treatment sufficient for tempering, heat strengthening and/or bending of an underlying glass substrate.

Accordingly, those skilled in the art will appreciate that a need in the art exists for a method of making a scratch resistant coated article that is capable of being heat treated (HT), e.g., thermally tempered, so that after heat treatment the coated article is still scratch resistant. A need for corresponding coated articles, both heat treated and pre-HT, also exists.

It is known to make a coated article including a zirconium nitride layer on a glass substrate, and then heat treating (e.g., thermal tempering) of the coated article causes the zirconium nitride layer to transform into a scratch resistant zirconium oxide layer having a refractive index (n) of 2.195 (n at 550 nm). For example, see U.S. Patent Document 2006/0057294 which is hereby incorporated herein by reference. While such heat treated coated articles are good and realize satisfactory results in many instances, there is room for improvement. For instance, such coated articles are problematic in that they tend to realize a "blue haze" problem upon HT when the zirconium nitride (optionally with overlying DLC) is converted into zirconium oxide, which is aesthetically displeasing. It is believed that when the zirconium nitride layer on the glass substrate is heat treated (e.g., thermally tempered at temperature(s) of at least 580 degrees C.) in order to convert it into zirconium oxide, micro-craze or cracks develop in the coating due to high tensile stress caused by (a) the HT, (b) sodium migration into the coating from the glass, and/or (c) the material transformation from zirconium nitride into zirconium oxide. The micro-craze or cracks cause the undesirable haze, which typically starts from the edges of the coated article and often extend to other areas. The undesirable haze appears whitish in color at a normal viewing angle. However, at large viewing angles such as from 45-60 degrees from normal the undesirable haze appears blue in color due to the size of coating craze and is thus sometimes referred to as "blue haze." The coated article when the zirconium nitride layer is initially deposited on the glass substrate (prior to HT) typically has a haze value of from 0.1 to 0.3% at a normal viewing angle, and upon HT when the zirconium nitride is converted into zirconium oxide the haze value increases to 1.0% or higher (haze values measured at a normal viewing angle). Longer HT times result in significant higher, and even more undesirable, haze values.

Thus, it will be apparent that there exists a need in the art to provide a coated article and/or manufacturing method therefor, which can reduce or eliminate the "blue haze" problem associated with the prior art, without significantly sacrificing scratch resistance (SR) properties of the coated article.

BRIEF SUMMARY OF EXAMPLES OF INVENTION

In certain example embodiments of this invention, there is provided a coated article and/or manufacturing method therefor, which can reduce or eliminate the "blue haze" problem discussed above associated with the prior art, without significantly sacrificing scratch resistance (SR) properties of the coated article. Such coated articles may be used, for example and without limitation, as windows such as interior shower windows, door windows, residential windows, or the like. Such coated articles are configured to be heat treated so that after being heat treated (HT), such as thermally tempered, the coated article is scratch resistant to an extent more than uncoated glass.

In certain example embodiments of this invention, a layer of or including substoichiometric zirconium oxide is sputter deposited, directly or indirectly, on a glass substrate via a substoichiometric zirconium oxide ceramic sputtering target of or including $ZrO_x$ (e.g., in the presence of an inert gas(es) such as argon in the sputtering chamber(s)), where "x" is preferably from 1.50 to 1.97, more preferably from 1.60 to 1.90, even more preferably from 1.70 to 1.87, and most preferably from 1.75 to 1.85. Thus, the substoichiometric sputtering target and/or the initially sputter-deposited layer of or including substoichiometric zirconium oxide may be of or include $ZrO_x$, where "x" is preferably from 1.50 to 1.97, more preferably from 1.60 to 1.90, even more preferably from 1.70 to 1.87, and most preferably from 1.75 to 1.85 (prior to HT such as thermal tempering). The layer of or including substoichiometric $ZrO_x$ may be the only layer on the glass substrate in certain example embodiments, or alternatively other layers may be present.

The coated article, with the substoichiometric $ZrO_x$ layer on the glass substrate, is then heat treated (e.g., thermally tempered) in an atmosphere including oxygen at temperature (s) of at least 580 degrees C., more preferably of at least 600 degrees C., which causes the substoichiometric $ZrO_x$ layer to transform into a scratch resistant layer of or including stoichiometric or substantially stoichiometric zirconium oxide (e.g., $ZrO_2$), and causes the visible transmission of the coated article to significant increase. Following the heat treatment (e.g., thermal tempering), the stoichiometric or substantially stoichiometric zirconium oxide may be represented by $ZrO_x$, where "x" is preferably from 1.98 to 2.05, more preferably from 1.99 to 2.02, with an example being 2.0 ($ZrO_2$). Thus, "x" increases due to the heat treatment. In certain example embodiments, the heat treatment (e.g., thermal tempering) causes the visible transmission ($T_{vis}$) of the coated article to increase by at least 4%, more preferably by at least 7%, and most preferably by at least 9%. Prior to HT, the coated article with the substoichiometric zirconium oxide inclusive layer on the glass substrate may have a visible transmission ($T_{vis}$) of at least 65% (more preferably of at least 70%, even more preferably of at least 73%, with an example being about 74%), and after HT the coated article may have a $T_{vis}$ of at least 75% (more preferably of at least 80%, even more preferably of at least 83%, with an example being about 84%). The result is a heat treated (e.g., thermally tempered) coated article, including the stoichiometric or substantially stoichiometric zirconium oxide (e.g., $ZrO_2$) inclusive layer on a heat treated (e.g., thermally tempered) glass substrate, that can be used for scratch resistant and/or corrosion resistant purposes for instance in window applications such as shower windows, shower or bathroom door windows, monolithic windows, and/or the like.

It has surprisingly, and unexpectedly, been found that the making of the scratch resistant coated article in such a manner, so as to include a layer of or including zirconium oxide on a glass substrate, reduces or eliminates the "blue haze" problem of the prior art discussed above, and also surprisingly results in a stronger crystalline structure with increased durability, and/or higher refractive index (n). Coated articles according to example embodiments of this invention, made as discussed above for example, may have a haze value of no greater than 0.5%, more preferably no greater than 0.3%, more preferably no greater than 0.1%, more preferably of no greater than 0.08%, and still more preferably of no greater than 0.06%, before and/or after the HT. Such low haze values (measured at normal viewing angles) represent a significant and surprising improvement over the prior art discussed above. Moreover, coated articles according to example embodiments of this invention, made as discussed above for example, may have a resulting zirconium oxide layer with a refractive index (n) of at least 2.21, more preferably of at least 2.22, and even more preferably of at least 2.23 (n at 550 nm), which is surprisingly higher than the prior art zirconium oxide refractive index of 2.195 discussed above. It has also been surprisingly and unexpectedly found that coated articles made as discussed above, are much less sensitive to long heat treating cycles and/or extremely high HT temperature(s) (e.g., haze values do not significantly increase with long HT cycles), and thus the products are easier to manufacture with improved yields.

Surprisingly, it has been found that the addition of tungsten (W) (e.g., doping with either pure tungsten or tungsten carbide) to the zirconium based layer remarkably improves the scratch resistance of the layer following heat treatment, compared to if the tungsten is not present. Unexpectedly, it has been found that the addition of the tungsten (W) to the zirconium based layer remarkably improves the scratch resistance of the layer, before and/or after heat treatment, compared to a pure ZrO coating on a glass substrate, and also compared to a pure WO coating on a glass substrate. Furthermore, it has been unexpectedly found that the addition of the tungsten (W) to the zirconium based layer improves the corrosion resistance of the coated article, before and/or after heat treatment. Thus, a coated article with improved scratch resistance (SR) and improved corrosion resistance/chemical stability is provided.

In certain example embodiments of this invention, there is provided a method of making a heat treated coated article, the method comprising: having a coated article including a coating on a glass substrate, the coating comprising a layer comprising substoichiometric zirconium oxide $ZrO_x$, where "x" is from 1.50 to 1.97 (more preferably from 1.60 to 1.90, even more preferably from 1.70 to 1.87, and most preferably from 1.75 to 1.85); and heat treating the coated article, including the glass substrate with the layer comprising substoichiometric zirconium oxide $ZrO_x$ thereon, so that the heat treating causes visible transmission ($T_{vis}$) of the coated article to increase by at least 4% (more preferably by at least 7%, and most preferably by at least 9%) and causes the layer comprising substoichiometric zirconium oxide $ZrO_x$ to transform into a layer comprising substantially stoichiometric $ZrO_x$ where "x" is from 1.98 to 2.05 (more preferably from 1.99 to 2.02, and most preferably 2), and wherein the heat treated coated article comprising the glass substrate and the layer comprising substantially stoichiometric $ZrO_x$ has a haze value of no greater than 0.5 (more preferably no greater than 0.3%, even more preferably no greater than 0.1%, and most preferably no greater than 0.8% or no greater than 0.6%).

In certain example embodiments of this invention, there is provided a method of making a heat treated coated article, the method comprising: having a coated article including a coating on a glass substrate, the coating comprising a layer comprising substoichiometric zirconium oxide $ZrO_x$, where "x" is from 1.50 to 1.97; heat treating the coated article, including the glass substrate with the layer comprising substoichiometric zirconium oxide $ZrO_x$ thereon, at temperature(s) of at least 580 degrees C. so that the heat treating causes visible transmission ($T_{vis}$) of the coated article to increase by at least 4% and causes the layer comprising substoichiometric zirconium oxide $ZrO_x$ to transform into a layer comprising substantially stoichiometric $ZrO_x$ where "x" is from 1.98 to 2.05, wherein after the heat treating the layer comprising substantially stoichiometric zirconium oxide $ZrO_x$ has a refractive index (n) of at least 2.21 and the coated article has a visible transmission of at least 75%; and wherein after the heat treating the layer comprising substantially stoichiometric zirconium oxide $ZrO_x$ is an uppermost layer of the coating and is exposed to ambient atmosphere.

DETAILED DESCRIPTION OF EXAMPLE EMBODIMENTS OF THE INVENTION

Figure 1:
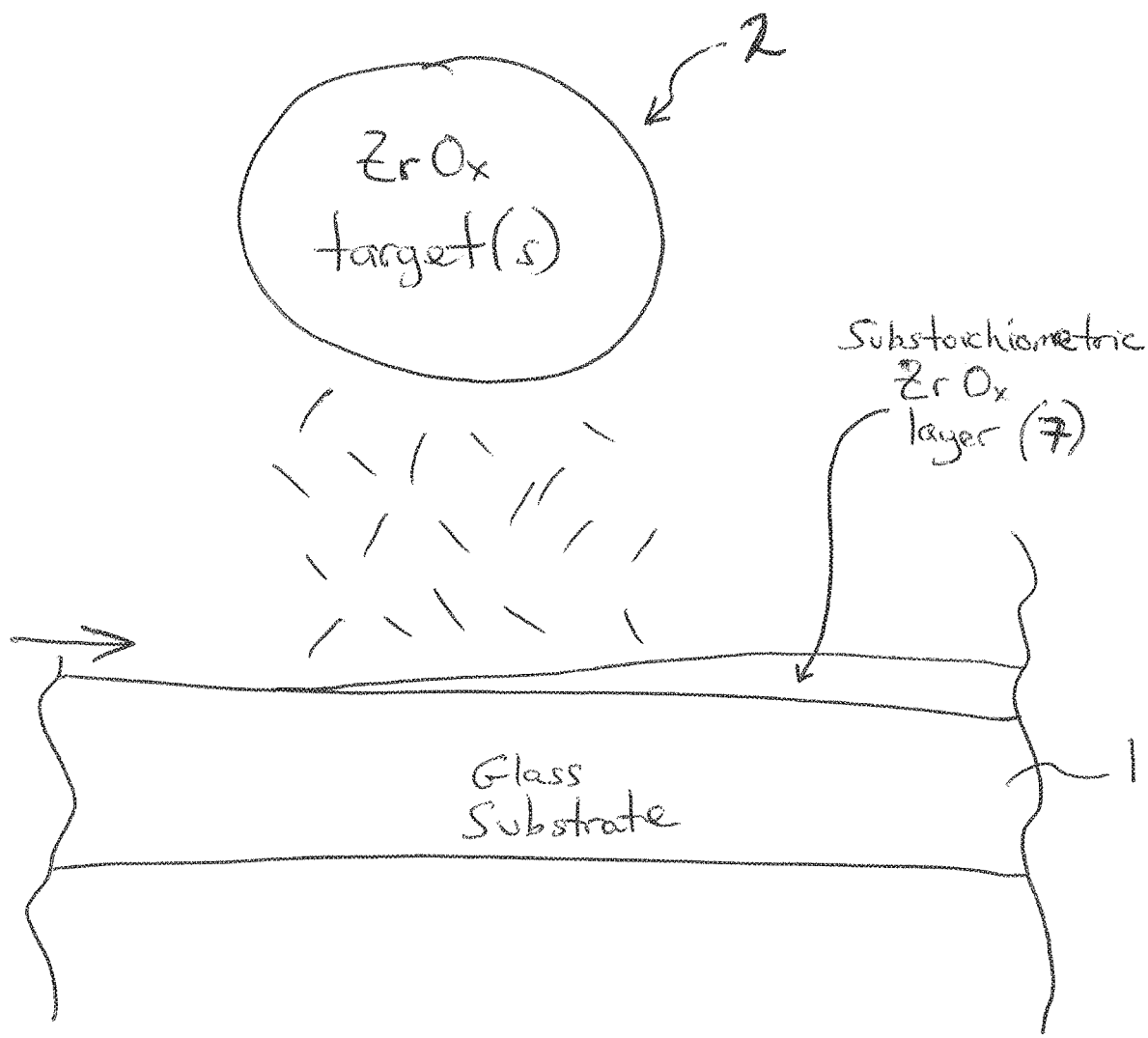
FIG. 1 is a schematic diagram illustrating a method of making a coated article according to an example embodiment of this invention.

Referring now more particularly to the accompanying drawings in which like reference numerals indicate like parts or layers throughout the several views.

In certain example embodiments of this invention, there is provided a coated article and/or manufacturing method therefor, which can reduce or eliminate the "blue haze" problem discussed above associated with the prior art, without significantly sacrificing scratch resistance (SR) properties of the coated article. Such coated articles may be used, for example and without limitation, as windows such as interior shower windows, door windows, residential windows, or the like. Such coated articles are configured to be heat treated so that after being heat treated (HT), such as thermally tempered, the coated article is scratch resistant to an extent more than uncoated glass.

Referring to FIG. 1, a dielectric layer of or including substoichiometric zirconium oxide 7 is sputter deposited, directly or indirectly, on a glass substrate 1 via a substoichiometric zirconium oxide ceramic sputtering target 2 of or including $ZrO_x$ (e.g., in the presence of an inert gas(es) such as argon in the sputtering chamber(s)), where in the target 2 and/or layer 7 "x" is preferably from 1.50 to 1.97, more preferably from 1.60 to 1.90, even more preferably from 1.70 to 1.87, and most preferably from 1.75 to 1.85, so that the zirconium oxide in the target 2 and/or in the layer 7 is substoichiometric. Note that stoichiometric zirconium oxide is $ZrO_2$. Glass substrate 1 is typically of or includes soda-lime-silica glass, although other types of glass may be used in certain instances. The gaseous atmosphere in the sputtering chamber(s) where layer 7 is deposited may be made up entirely of an inert gas(es) such as argon and/or krypton (e.g., 450-600 sccm Ar) with no intentional oxygen and/or nitrogen gas flow, or alternatively a small amount of oxygen gas and/or nitrogen gas may also be present. In preferred embodiments, the gaseous atmosphere in the sputtering chamber(s) where layer 7 is sputter-deposited contains at least 75% inert gas such as argon, more preferably at least 85% inert gas, and most preferably at least 95% inert gas such as argon (with 98, 99, or 100% argon gas being an example in the sputtering chamber(s)).

Sputtering target(s) 2 may be a stationary planar target(s), or a rotating magnetron sputtering target(s), in example embodiments of this invention; and glass substrate 1 may be moving in the direction to the right under the target 2 as shown by the arrow in FIG. 1 during the sputter-deposition process in certain example embodiments. Thus, the substoichiometric sputtering target 2 and/or the initially sputter-deposited dielectric layer 7 of or including substoichiometric zirconium oxide may be of or include $ZrO_x$, where "x" (on an atomic basis) is preferably from 1.50 to 1.97, more preferably from 1.60 to 1.90, even more preferably from 1.70 to 1.87, and most preferably from 1.75 to 1.85 (prior to HT such as thermal tempering). The layer of or including substoichiometric $ZrO_x$ 7 may be the only layer on the glass substrate in certain example embodiments, or alternatively other layers may be present. For example, a dielectric barrier layer (not shown) of or including silicon nitride, silicon oxide, and/or silicon oxynitride, or other suitable material, may be provided between the glass substrate 1 and the $ZrO_x$ inclusive layer 7 in certain example embodiments of this invention. Thus, the dielectric zirconium oxide based layer 7 may be deposited directly on and contacting the glass substrate 1 as shown in FIG. 1, or alternatively may be deposited on the glass substrate 1 over one or more other dielectric layer(s). Moreover, in certain example embodiments of this invention, a layer of or including DLC may be provided over layer 7 on the glass substrate 1, with the DLC configured to burn off during HT. In other example embodiments of this invention, a low-E coating (not shown) including at least one silver based infrared (IR) reflecting layer sandwiched between at least first and second dielectric layers, may be provided on the glass substrate 1 between the glass substrate 1 and the zirconium oxide based layer 7, 11, so that the zirconium oxide based layer 7 and/or 11 functions as a protective overcoat to protect the low-E coating.

Dielectric layer 7 may consist of, or consist essentially of, substoichiometric zirconium oxide $ZrO_x$ in certain example embodiments of this invention. However, the zirconium oxide based layer 7 may optionally be doped with other element(s) such as W, N F, C, and/or Cu in alternative embodiments of this invention. For example, the $ZrO_x$ based layer 7 may optionally contain from 0-10%, more preferably 0-5%, even more preferably 0-2%, and possibly from 1-10%, 1-5%, or 1-2%, of W, N and/or Cu (atomic %). In any event, dielectric layer 7 as sputter-deposited is based on substoichimetric zirconium oxide ($ZrO_x$).

Figure 2:
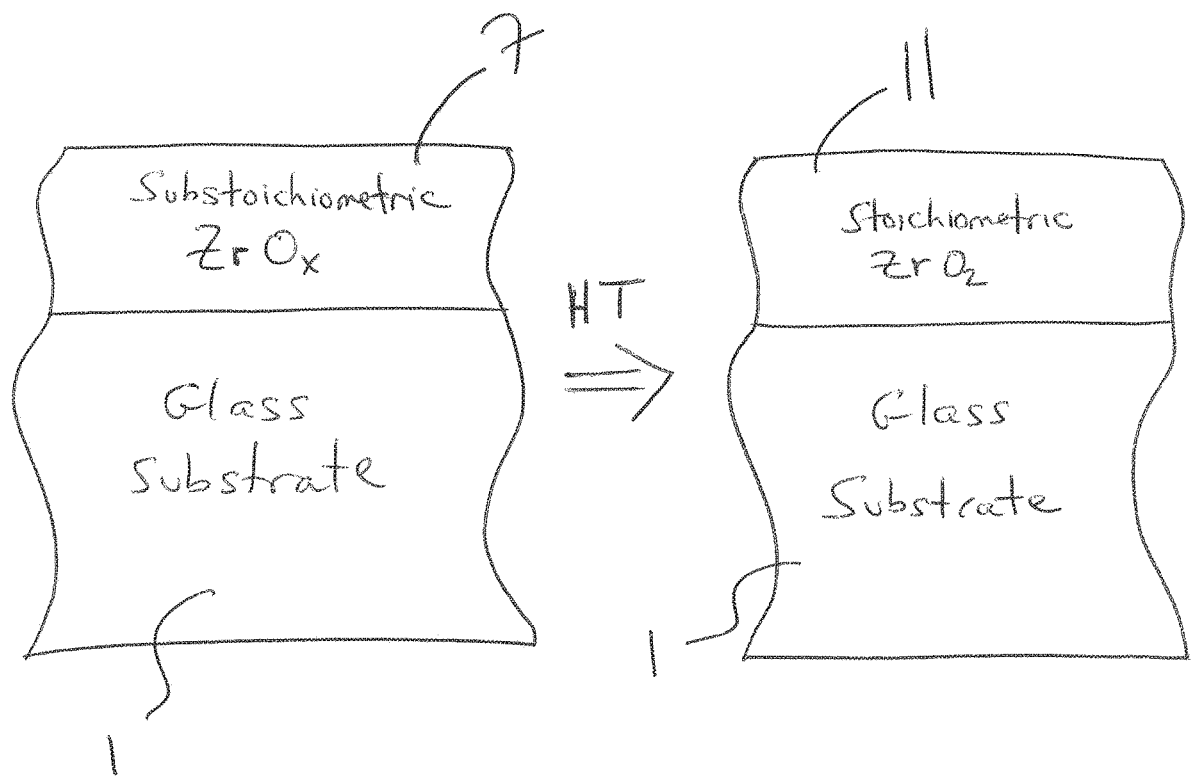
FIG. 2 is a schematic diagram illustrating a cross-section of a coated article, before and after heat treatment (HT), according to an embodiment of this invention.

As shown in FIG. 2, the coated article with the substoichiometric $ZrO_x$ layer 7 on the glass substrate 1 is then heat treated (HT) (e.g., thermally tempered) in an atmosphere including oxygen gas at temperature(s) of at least 550 degrees C., more preferably of at least 580 degrees C., and most preferably of at least 600 degrees C. (e.g., for from about 4-15 minutes more preferably from about 5-8 minutes), which causes the substoichiometric $ZrO_x$ layer 7 to transform into a scratch resistant layer of or including stoichiometric or substantially stoichiometric zirconium oxide (e.g., $ZrO_2$) 11, and causes the visible transmission of the coated article to significant increase. Heat treatment preferably uses temperature(s) of from 550 to 800 degrees C., more preferably from 580 to 800 degrees C. Following the heat treatment (e.g., thermal tempering), the stoichiometric or substantially stoichiometric zirconium oxide of layer 11 may be represented by $ZrO_x$, where "x" is preferably from 1.98 to 2.05, more preferably from 1.99 to 2.02, with an example being 2.0 ($ZrO_2$). Thus, "x" increases due to the heat treatment.

In certain example embodiments, the heat treatment (e.g., thermal tempering) causes the visible transmission ($T_{vis}$) of the coated article to increase by at least 4%, more preferably by at least 7%, and most preferably by at least 9%, by decreasing absorption of the zirconium oxide based layer. Prior to HT, the coated article with the substoichiometric zirconium oxide inclusive layer 7 on the glass substrate 1 may have a visible transmission ($T_{vis}$) of at least 65% (more preferably of at least 70%, even more preferably of at least 73%, with an example being about 74%), and after HT the coated article with layer 11 on the glass substrate 1 may have a $T_{vis}$ of at least 75% (more preferably of at least 80%, even more preferably of at least 83%, with an example being about 84%). The result is a heat treated (e.g., thermally tempered) coated article, including the stoichiometric or substantially stoichiometric zirconium oxide (e.g., $ZrO_2$)

inclusive layer 11 on a heat treated (e.g., thermally tempered) glass substrate 1, that can be used for scratch resistant and/or corrosion resistant purposes for instance in window applications such as shower windows, shower or bathroom door windows, monolithic windows, and/or the like.

It has surprisingly, and unexpectedly, been found that the making of the scratch resistant coated article in such a manner, so as to include a layer of or including zirconium oxide on a glass substrate, reduces or eliminates the "blue haze" problem of the prior art discussed above, and also surprisingly results in a stronger and more stable crystalline structure with increased durability, and/or higher refractive index (n). In certain example embodiments, the zirconium oxide deposited with the substoichiometric target 2 has a very strong tetragonal crystalline structure, with some monoclinic, and a few cubic structure (whereas when deposited with a metal Zr target the resulting zirconium oxide has a pure monoclinic structure). Coated articles according to example embodiments of this invention, made as discussed above for example, may have a haze value of no greater than 0.5%, more preferably no greater than 0.3%, more preferably no greater than 0.1%, more preferably of no greater than 0.08%, and still more preferably of no greater than 0.06%, before and/or after the HT. Such low haze values (measured at normal viewing angles) represent a significant and surprising improvement over the prior art discussed above. Moreover, coated articles according to example embodiments of this invention, made as discussed above for example, may have a resulting zirconium oxide layer 11 with a refractive index (n) of at least 2.21, more preferably of at least 2.22, and even more preferably of at least 2.23 (n at 550 nm), which is surprisingly higher than the prior art zirconium oxide refractive index of 2.195 discussed above. It has also been surprisingly and unexpectedly found that coated articles made as discussed above, are much less sensitive to long heat treating cycles and/or extremely high HT temperature(s) (e.g., haze values do not significantly increase with long HT cycles), and thus the products are easier to manufacture with improved yields. The use of the substoichiometric ceramic target(s) 2 also allows for the deposition rate, for depositing the layer, to be increased compared to a metal target for example.

In certain example embodiments of this invention, the zirconium oxide based layers 7, 11 may be from about 1 to 250 nm thick, more preferably from about 1 to 100 nm thick, even more preferably from about 5 to 50 nm thick, and most preferably from about 10-40 nm thick. An example thickness for layer 7 and layer 11 is about 300 angstroms, which is the same as 30 nm.

It has also surprisingly and unexpectedly been found that making coated articles as discussed herein can provide for, in addition to low haze values discussed herein, aesthetically pleasing visible transmission and color values before and/or after HT. In particular, see the neutral coloration in Tables 1-2 below. Note that $R_GY$ stands for glass side reflection (and $a^*_G$ thus stands for glass side reflective $a^*$ color value, and so forth), and $R_FY$ stands for film side reflection, as known in the art.

TABLE 1

| Color/Optical Characteristics (pre-HT monolithic) | | | |
|---|---|---|---|
|  | General | Preferred | Most Preferred |
| $T_{vis}$ (TY): | 65-90% | 70-80% | 70-78% |
| $a^*_T$ | −5 to +5 | −3 to +3 | −2 to +2 |
| $b^*_T$ | −7 to +7 | −5 to +5 | −3 to +3 |
| $R_GY$(glass side): | 10-16% | 11-15% | 11-13% |
| $a^*_G$ | −4 to +4 | −2 to +2 | −1 to +1 |
| $b^*_G$ | −10 to +10 | −8 to +8 | −6 to +6 |
| $R_FY$(film side): | 12-18% | 13-17% | 14-16% |
| $a^*_F$ | −4 to +4 | −2 to +2 | −1 to +1 |
| $b^*_F$ | −10 to +10 | −8 to +8 | −6 to +6 |

TABLE 2

| Color/Optical Characteristics (post-HT monolithic) | | | |
|---|---|---|---|
|  | General | Preferred | Most Preferred |
| $T_{vis}$ (TY): | 75-91% | 80-90% | 83-90% |
| $a^*_T$ | −5 to +5 | −3 to +3 | −2 to +2 |
| $b^*_T$ | −7 to +7 | −5 to +5 | −3 to +3 |
| $R_GY$(glass side): | 10-17% | 11-16% | 11-14% |
| $a^*_G$ | −4 to +4 | −2 to +2 | −1 to +1 |
| $b^*_G$ | −12 to +10 | −9 to +8 | −7 to +6 |
| $R_FY$(film side): | 11-18% | 12-17% | 12-16% |
| $a^*_F$ | −4 to +4 | −2 to +2 | −1 to +1 |
| $b^*_F$ | −12 to +10 | −9 to +8 | −7 to +6 |

For purposes of example only, an example coated article was made and measured.

EXAMPLE

A dielectric layer of substoichiometric zirconium oxide $ZrO_x$ 7 was sputter deposited directly on a soda-lime-silica glass substrate 1 via a substoichiometric zirconium oxide ceramic sputtering target 2 of $ZrO_x$ in the presence of only argon gas in the sputtering chamber, where "x" was about 1.82 in both the target 2 and the initially sputter-deposited layer 7. The glass substrate 1 with the substoichiometric $ZrO_x$ layer 7 thereon was then thermally tempered in an atmosphere including oxygen gas at temperature(s) of about 600-620 degrees C., which caused the substoichiometric $ZrO_x$ layer 7 to transform into a scratch resistant layer of stoichiometric $ZrO_2$ 11, and caused the visible transmission of the coated article to significantly increase. The following measurements were taken of this example, before and after the thermal tempering heat treatment, in Table 3, demonstrating desirable neutral coloration and transmission characteristics. The haze value before and after HT was no more than 0.1%.

TABLE 3

| Measurements of Example (pre and post-HT) | | | | | | | | | |
|---|---|---|---|---|---|---|---|---|---|
|  | Tvis | | | R - glass side | | | R - film side | | |
|  | T | a* | b* | R | a* | b* | R | a* | b* |
| As Coated | 74% | −1.3 | 2.4 | 12% | −0.6 | −4.9 | 15% | −0.3 | −4.9 |
| Post-HT | 84% | −1.6 | 2.0 | 13% | −0.9 | −6.0 | 13% | −0.3 | −6.4 |

In an example embodiment of this invention, there is provided a method of making a heat treated coated article, the method comprising: having a coated article including a coating on a glass substrate, the coating comprising a layer comprising substoichiometric zirconium oxide $ZrO_x$, where "x" is from 1.50 to 1.97 (more preferably from 1.60 to 1.90, even more preferably from 1.70 to 1.87, and most preferably from 1.75 to 1.85); and heat treating the coated article, including the glass substrate with the layer comprising substoichiometric zirconium oxide $ZrO_x$ thereon, so that the heat treating causes visible transmission ($T_{vis}$) of the coated article to increase by at least 4% (more preferably by at least 7%, and most preferably by at least 9%) and causes the layer comprising substoichiometric zirconium oxide $ZrO_x$ to transform into a layer comprising substantially stoichiometric $ZrO_x$ where "x" is from 1.98 to 2.05 (more preferably from 1.99 to 2.02, and most preferably 2), and wherein the heat treated coated article comprising the glass substrate and the layer comprising substantially stoichiometric $ZrO_x$ has a haze value of no greater than 0.5 (more preferably no greater than 0.3%, even more preferably no greater than 0.1%, and most preferably no greater than 0.8% or no greater than 0.6%).

In the method of the immediately preceding paragraph, the layer comprising substoichiometric zirconium oxide $ZrO_x$ may consist of, or consist essentially of, substoichiometric zirconium oxide $ZrO_x$.

In the method of any of the preceding two paragraphs, the layer comprising substantially stoichiometric zirconium oxide $ZrO_x$ may consist of, or consist essentially of, substantially stoichiometric zirconium oxide $ZrO_x$.

In the method of any of the preceding three paragraphs, after the heat treating the coated article may have a visible transmission of at least 75% (more preferably at least 80%, and most preferably at least 83%).

In the method of any of the preceding four paragraphs, after the heat treating the layer comprising substantially stoichiometric zirconium oxide $ZrO_x$ may have a refractive index (n) of at least 2.21 (more preferably at least 2.22, and most preferably at least 2.23).

In the method of any of the preceding five paragraphs, before and/or after the heat treating, the coated article may further include a layer comprising silicon nitride between the glass substrate and the layer comprising $ZrO_x$.

In the method of any of the preceding six paragraphs, before and/or after the heat treating, the coated article may further include a layer comprising silver sandwiched between at least first and second dielectric layers on the glass substrate and between the glass substrate and the layer comprising $ZrO_x$.

In the method of any of the preceding seven paragraphs, after the heat treating the coated article may have a glass side reflective a* color value from −4 to +4 and/or a glass side reflective b* color value from −12 to +10.

In the method of any of the preceding eight paragraphs, after the heat treating the coated article may have a glass side reflective a* color value from −2 to +2 and/or a glass side reflective b* color value from −9 to +8.

In the method of any of the preceding nine paragraphs, after the heat treating the coated article may have a film side reflective a* color value from −4 to +4 and/or a film side reflective b* color value from −12 to +10.

In the method of any of the preceding ten paragraphs, after the heat treating the coated article may have a film side reflective a* color value from −2 to +2 and/or a film side reflective b* color value from −9 to +8.

In the method of any of the preceding eleven paragraphs, the layer comprising $ZrO_x$ may be an uppermost layer of the coating, configured to be exposed to ambient atmosphere, before and/or after the heat treating.

In the method of any of the preceding twelve paragraphs (except for the paragraphs calling for additional layer(s) between the glass substrate and the zirconium oxide inclusive layer, the layer comprising $ZrO_x$ may be in direct contact with the glass substrate before and/or after the heat treating.

The method any of the preceding thirteen paragraphs may further comprise sputter depositing the layer comprising substoichiometric zirconium oxide $ZrO_x$ on the glass substrate, directly or indirectly, using at least one ceramic sputtering target comprising $ZrO_x$ where in the target "x" is from 1.50 to 1.97.

The method any of the preceding fourteen paragraphs may further comprise sputter depositing the layer comprising substoichiometric zirconium oxide $ZrO_x$ on the glass substrate, directly or indirectly, using at least one ceramic sputtering target comprising $ZrO_x$ where in the target "x" is from 1.60 to 1.90.

In the method of any of the preceding fifteen paragraphs, the layer comprising $ZrO_x$ may have a physical thickness of from 5 to 50 nm (more preferably from 10-40 nm).

In the method of any of the preceding sixteen paragraphs, the heat treating may comprise thermal tempering and/or may comprise heat treating at temperature(s) of at least 580 degrees C.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of making a heat treated coated article, the method comprising:
    having a coated article including a coating on a glass substrate, the coating comprising a layer comprising substoichiometric zirconium oxide $ZrO_x$ that directly contacts the glass substrate, where "x" is from 1.50 to 1.97; and
    heat treating the coated article, including the glass substrate with the layer comprising substoichiometric zirconium oxide $ZrO_x$ thereon, so that the heat treating causes visible transmission ($T_{vis}$) of the coated article to increase by at least 4% and causes the layer comprising substoichiometric zirconium oxide $ZrO_x$ to transform into a layer comprising substantially stoichiometric $ZrO_x$ where "x" is from 1.98 to 2.05, and wherein the heat treated coated article comprising the glass substrate and the layer comprising substantially stoichiometric $ZrO_x$ has a haze value of no greater than 0.3%.

2. The method of claim 1, wherein the heat treated coated article comprising the glass substrate and the layer comprising substantially stoichiometric $ZrO_x$ has a haze value of no greater than 0.1%.

3. The method of claim 1, wherein the heat treated coated article comprising the glass substrate and the layer comprising substantially stoichiometric $ZrO_x$ has a haze value of no greater than 0.08%.

4. The method of claim 1, wherein the heat treating causes visible transmission ($T_{vis}$) of the coated article to increase by at least 7%.

5. The method of claim 1, wherein the heat treating causes the layer comprising substoichiometric zirconium oxide $ZrO_x$ to transform into a layer comprising substantially stoichiometric $ZrO_x$ where "x" is from 1.99 to 2.02.

6. The method of claim 1, wherein the heat treating causes the layer comprising substoichiometric zirconium oxide $ZrO_x$ to transform into a layer comprising stoichiometric $ZrO_x$ where "x" is 2.

7. The method of claim 1, wherein the layer comprising substoichiometric zirconium oxide $ZrO_x$ consists of, or consists essentially of, substoichiometric zirconium oxide $ZrO_x$.

8. The method of claim 1, wherein the layer comprising substantially stoichiometric zirconium oxide $ZrO_x$ consists of, or consists essentially of, substantially stoichiometric zirconium oxide $ZrO_x$.

9. The method of claim 1, wherein in the layer comprising substoichiometric zirconium oxide $ZrO_x$, "x" is from 1.60 to 1.90.

10. The method of claim 1, wherein in the layer comprising substoichiometric zirconium oxide $ZrO_x$, "x" is from 1.70 to 1.87.

11. The method of claim 1, wherein after the heat treating the coated article has a visible transmission of at least 75%.

12. The method of claim 1, wherein after the heat treating the coated article has a visible transmission of at least 80%.

13. The method of claim 1, wherein after the heat treating the layer comprising substantially stoichiometric zirconium oxide $ZrO_x$ has a refractive index (n) of at least 2.21.

14. The method of claim 1, wherein after the heat treating the layer comprising substantially stoichiometric zirconium oxide $ZrO_x$ has a refractive index (n) of at least 2.22.

15. The method of claim 1, wherein, before and/or after the heat treating, the coated article further includes a layer comprising silicon nitride between the glass substrate and the layer comprising $ZrO_x$.

16. The method of claim 1, wherein, before and/or after the heat treating, the coated article further includes a layer comprising silver sandwiched between at least first and second dielectric layers on the glass substrate located between the glass substrate and the layer comprising $ZrO_x$.

17. The method of claim 1, wherein after the heat treating the coated article has a glass side reflective a* color value from −4 to +4 and a glass side reflective b* color value from −12 to +10.

18. The method of claim 1, wherein after the heat treating the coated article has a glass side reflective a* color value from −2 to +2 and a glass side reflective b* color value from −9 to +8.

19. The method of claim 1, wherein after the heat treating the coated article has a film side reflective a* color value from −4 to +4 and a film side reflective b* color value from −12 to +10.

20. The method of claim 1, wherein after the heat treating the coated article has a film side reflective a* color value from −2 to +2 and a film side reflective b* color value from −9 to +8.

21. The method of claim 1, wherein the layer comprising $ZrO_x$ is an uppermost layer of the coating, configured to be exposed to ambient atmosphere, before and/or after the heat treating.

22. The method of claim 1, further comprising sputter depositing the layer comprising substoichiometric zirconium oxide $ZrO_x$ on the glass substrate, directly or indirectly, using at least one ceramic sputtering target comprising $ZrO_x$ where in the target "x" is from 1.50 to 1.97.

23. The method of claim 1, further comprising sputter depositing the layer comprising substoichiometric zirconium oxide $ZrO_x$ on the glass substrate, directly or indirectly, using at least one ceramic sputtering target comprising $ZrO_x$ where in the target "x" is from 1.60 to 1.90.

24. The method of claim 1, wherein after the heat treating the layer comprising $ZrO_x$ has a physical thickness of from 5 to 50 nm.

25. The method of claim 1, wherein the heat treating comprises thermal tempering.

26. The method of claim 1, wherein the heat treating comprises heat treating at temperature(s) of at least 580 degrees C.

27. A method of making a heat treated coated article, the method comprising:
    having a coated article including a coating on a glass substrate, the coating comprising a layer comprising substoichiometric zirconium oxide $ZrO_x$ that directly contacts the glass substrate, where "x" is from 1.50 to 1.97;
    heat treating the coated article, including the glass substrate with the layer comprising substoichiometric zirconium oxide $ZrO_x$ thereon, at temperature(s) of at least 580 degrees C. so that the heat treating causes visible transmission ($T_{vis}$) of the coated article to increase by at least 4% and causes the layer comprising substoichiometric zirconium oxide $ZrO_x$ to transform into a layer comprising substantially stoichiometric $ZrO_x$ where "x" is from 1.98 to 2.05, wherein after the heat treating the layer comprising substantially stoichiometric zirconium oxide $ZrO_x$ has a refractive index (n) of at least 2.21 and the coated article has a visible transmission of at least 75%; and
    wherein after the heat treating the layer comprising substantially stoichiometric zirconium oxide $ZrO_x$ is an uppermost layer of the coating and is exposed to ambient atmosphere.

28. The method of claim 27, wherein after the heat treating the coated article has a glass side reflective a* color value from −4 to +4 and a glass side reflective b* color value from −12 to +10.

29. The method of claim 27, wherein after the heat treating the coated article has a glass side reflective a* color value from −2 to +2 and a glass side reflective b* color value from −9 to +8.

30. The method of claim 27, wherein after the heat treating the coated article has a film side reflective a* color value from −4 to +4 and a film side reflective b* color value from −12 to +10.

31. The method of claim 27, wherein after the heat treating the coated article has a film side reflective a* color value from −2 to +2 and a film side reflective b* color value from −9 to +8.

* * * * *